(12) United States Patent
Castro-Leon et al.

(10) Patent No.: US 10,275,004 B2
(45) Date of Patent: Apr. 30, 2019

(54) DATA CENTER MANAGEMENT (71) Applicant: Intel Corporation, Santa Clara, CA (US)

(72) Inventors: Enrique Castro-Leon, Clackamas, OR (US); David Larsen, Hillsboro, OR (US); Todd Enger, Taipei (TW); Jose Zero, Santa Clara, CA (US); David Locklear, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 897 days.

(21) Appl. No.: 14/296,007

(22) Filed: Jun. 4, 2014

(65) Prior Publication Data

US 2015/0355699 A1  Dec. 10, 2015

(51) Int. Cl.
| | | |
|---|---|---|
| *G06F 1/00* | (2006.01) | |
| *G06F 1/30* | (2006.01) | |
| *G06F 1/324* | (2019.01) | |
| *G06F 1/3206* | (2019.01) | |

(52) U.S. Cl.
CPC ............... *G06F 1/30* (2013.01); *G06F 1/324* (2013.01); *G06F 1/3206* (2013.01); *Y02D 10/126* (2018.01)

(58) Field of Classification Search
CPC ........................................................ G06F 1/32
See application file for complete search history.

(56) References Cited

U.S. PATENT DOCUMENTS

| | | | | |
|---|---|---|---|---|
| 2009/0113221 A1* | 4/2009 | Holle | ...................... | G06F 1/189 713/310 |
| 2013/0198591 A1* | 8/2013 | Kamuf | .................. | H04L 1/1861 714/780 |
| 2014/0067294 A1* | 3/2014 | Sivasubramaniam | ....................... | G06F 11/3006 702/60 |
| 2014/0089698 A1* | 3/2014 | Ng | ......................... | G06F 1/3206 713/322 |
| 2014/0095903 A1* | 4/2014 | Muccini | ................ | G06F 1/3296 713/320 |
| 2014/0232355 A1* | 8/2014 | Masuda | ................ | B60L 3/0069 320/137 |
| 2014/0359338 A1* | 12/2014 | Park | .......................... | G06F 1/26 713/340 |
| 2014/0365795 A1* | 12/2014 | Nielsen | ............... | G06F 9/45558 713/320 |

* cited by examiner

*Primary Examiner* — Mohammed H Rehman
(74) *Attorney, Agent, or Firm* — International IP Law Group, P.L.L.C.

(57) ABSTRACT

Techniques for providing power to components of a computer system are described. An example of a computer system includes a plurality of server nodes and a power distribution system that provides power to the plurality of server nodes. The computer system also includes a hardware-based alert signal line that couples the power distribution system to the plurality of server nodes. If a power failure occurs, the power distribution system is to send an alert signal to all of the server nodes through the alert signal line. The alert signal triggers each server node to activate a low power state.

23 Claims, 5 Drawing Sheets

DATA CENTER MANAGEMENT

TECHNICAL FIELD

The present disclosure relates generally to techniques for managing the resources of a data center. More specifically, the present techniques relate to techniques for providing power to components of a computer system such as a server rack or chassis.

BACKGROUND ART

A data center is a facility that is used to provide computing resources to a number of networked client computing devices. Systems such as enterprise storage systems, cloud computing systems, storage area networks, Web hosting services, or any other type of computing system that uses a large amount of storage or processing resources may be housed in a data center. Client computers typically connect to a data center through one of several server computers. The servers and the data storage systems are mounted in enclosures such as racks or chassis. To ensure a suitable level of fault tolerance, a certain level of redundancy is built in to the data center.

BRIEF DESCRIPTION OF THE DRAWINGS

FIG. 5 is a block diagram showing a tangible, non-transitory computer-readable medium that stores code for managing power in a computer system The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

The subject matter disclosed herein relates to techniques for managing power in a computing system such as a server rack or chassis. As mentioned above, data centers typically include a certain level of redundancy. For example, the power distribution system of a typical server rack may include one or more redundant power supply units (PSUs) to be used only in case a power supply unit fails. However, providing even a single redundant power supply unit adds significant additional cost to the server rack. The present disclosure provides a technique for responding to a failure of the power distribution system, thereby eliminating the need to provide redundant power supply units.

Power management in a server rack can be implemented in a component referred to herein as a system manager. The system manager may be a rack manager, a chassis manager, or other type of system manager, depending on the type of computer system in which it is implemented. The system manager can implement power policies for servers, such as by specifying power consumption limits for each server. Using the system manager to manage power consumption is suitable for control changes that take place over the course of several minutes, for example, for following daily load cycles with adjustments done every fifteen minutes or so. However, in the case of a power supply unit failure, the normal communication routes that the system manager uses are inadequate to avoid cascading failure of the remaining power supply units.

One technique for quickly reducing the power consumption of an individual server is referred to a throttling. Throttling cause a server's central processing unit (CPU) to operate at a reduced frequency, which reduces power consumption but also slows down applications with potentially severe performance impact. The present disclosure provides a hardware-based alert signal that can alert all server nodes in the system simultaneously. In some examples, the alert signal can trigger a two-phase power management process that is implemented by the system manager and each of the server nodes independently. The two-part power management process provides a fast reaction time that enables the system to avoid cascading failure and also enables the server nodes to operate at a higher level of performance closer to the available power budget. Various examples of the present techniques are described further below with reference to the figures.

Figure 1:
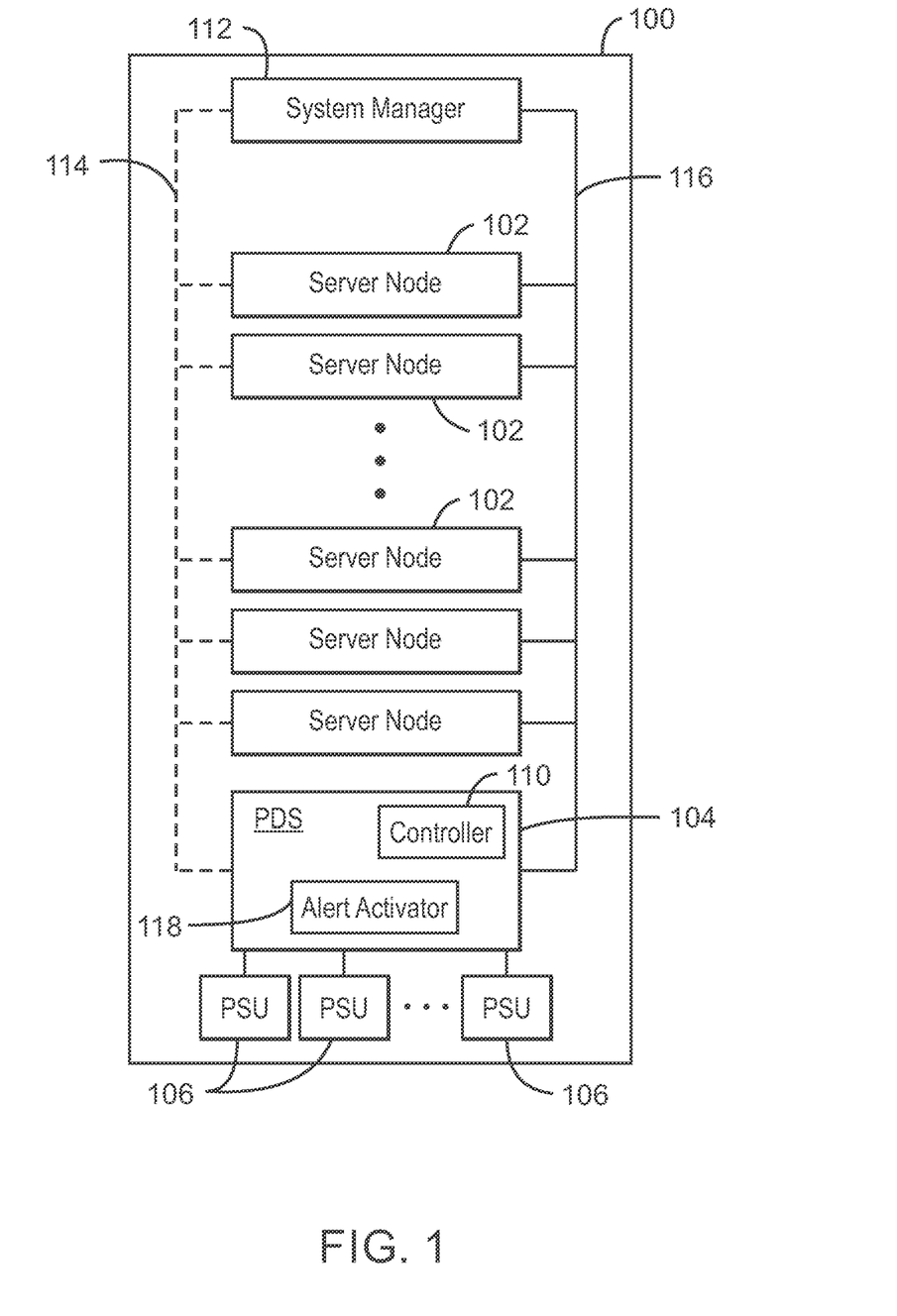
FIG. 1 is a block diagram of a computer system that includes several server nodes.

FIG. 1 is a block diagram of a computer system that includes a plurality of server nodes. The computer system 100 includes a housing (not shown) that holds the server nodes 102. The housing may be a server rack or a chassis, for example. In a server rack, each server node 102 is housed within its own enclosure and is installed in a shelf of the rack. Connections between server nodes 102 and other components in the rack can be made through cables. In a chassis, the server nodes 102, often referred to as blade servers, do not include an enclosure separate from the chassis. Each blade server plugs into a slot in the chassis, and connections between server nodes 102 and other components of the chassis are accomplished using traces included in the chassis baseboard. The computer system 100 may include any suitable number of server nodes 102, including 4, 8, 16, 24, 48, 96 server nodes or more. Each server node 102 is a computing device that responds to client requests across a computer network. For example, the server nodes 102 may respond to client requests to access storage space of a storage system.

Each server node 102 receives power from a power distribution system 104, which is coupled to a number of power supply units 106. The power distribution system 104 receives power from the power supply units 106 and delivers power to other components in the computer system 100, including the server nodes 102 and the system manager 112. Power may be delivered from the power distribution system 104 to other components through a Direct Current (DC) power rail of a chassis or through power cables, depending on the particular configuration. The number of power supply units 106 may be determined based on the total expected power demands that will be experienced by the all of the components included in the computer system 100. In some examples, the number of power supply units 106 is just sufficient to supply the expected power demands. In other words, in some examples, no redundant power supplies are included. The power distribution system 104 can include a controller 110. The controller 110 can be used to acquire status information from the power supply units 106 and report the information to other components in the computer system 100. The controller 110 can be any suitable type of processor, including an application specific integrated circuit, microcontroller, field programmable gate array (FPGA), or programmable logic controller (PLC), among others.

Also included in the computer system 100 is a system manager 112. The system manager 112 provides a variety of management functions for the computer system 100, such as node presence monitoring, node startup and shutdown, system-wide power management, fan monitoring, and thermal monitoring, among others. The system manager 112 can be coupled through serial communication lines 114 to each of the server nodes 102 and the power distribution system 104. The serial communication lines 114 can be Inter-Integrated Circuit (I2C) protocol lines, RS-232 serial lines, System Management Bus (SMBus) lines or Power Management Bus (PMBus) lines, for example. The serial communication lines 114 enable point-to-point communications between ports of the system manager 112 and ports of the server nodes 102. Each serial communication line 114 can be implemented using universal asynchronous receiver/transmitters (UARTs) that translate data between parallel and serial forms. The system manager 112 may include any suitable number of UARTs, including 1, 2, 4, or 8 UARTs, for example. The number of UARTs in a device determines the number of other components that the device can communicate with at one time. For example, if the system manager 112 includes four UARTs, the rack manger 112 can communicate with up to four server nodes 102 at a time.

In the event of a power supply unit 106 failure, the server nodes 102 will triggered to enter an aggressive low power state. The low power state may be implemented by commanding each server node 102 to reduce the clock frequency of the processing resources included in the server node 102. Operating at a lower frequency reduces power consumption in the server node's processing units and also results in reduced heat generation. Thus, if the server node 102 includes cooling fans the cooling fans can also be commanded to turn off, resulting in more power savings. Entering the server nodes 102 into an aggressive low power state helps to ensure that the power budget provided by the remaining power supply units 106 is not exceeded and reduces the likelihood of a cascading failure of power supply units 106 for most anticipated contingencies.

To avoid overloading the remaining power supply units 106, all of the server nodes 102 are commanded to enter the low power state within a very short time period. The complexity of the serial communication lines 114 and the fact that the system manager 112 can only communicate with a limited number of server nodes 102 at one time through the serial communication lines 114 makes the serial communication lines 114 unsuitable for commanding the server nodes 102 to enter the low power state within a suitable time frame. To enable the server nodes 106 to respond to the power supply failure within a suitable time frame, the computing system 100 includes an alert signal line 116. Upon the failure of a power supply unit 106, the power distribution system can send an alert signal to each server node 102 and the system manager 112 through the alert signal line 116. The alert signal line 116 is hardware based, meaning that the alert signal line is implemented as a conductor that is coupled to a dedicated input line of one or more processors and the indication of an alert at a particular time is determined by the state of the signal line at that time, i.e., whether the signal line is on (logic 1) or off (logic 0). Thus, no signal processing is required to send or receive the alert signal, such as translating between parallel and serial forms, interpreting packet information, and the like. Rather, the indication of an alert is triggered simply by activating, i.e., turning on, the alert signal line. For this reason, the alert signal line 116 enables the alert signal to be communicated to each of the server nodes 102 and the system manager 112 simultaneously.

The alert signal can be activated by setting the alert signal line 116 to a value of logical 1. In some examples, the controller 110 activates the alert signal. In some examples, the power distribution system 104 includes an additional logic device that activates the alert signal and is referred to herein as the alert activator 118. The alert activator 118 can be any suitable hardware device that can respond to a failure of a power supply unit by applying a specified voltage to the alert signal line 116. For example, the alert activator 118 can include a set of "OR" gates with inputs coupled to the power supply units 106 and outputs coupled to the alert signal line.

In response to activation of the alert signal line, each of the server nodes 102 will enter a low power state. The server node's response to the alert signal can be a pre-determined response. For example, each server may be pre-programmed to cut its operating frequency by a pre-specified level. For example, the operating frequency may be reduced from 3 Gigahertz to 800 Megahertz. The pre-determined level results in a power reduction that is fast-acting enough to avoid a cascading power failure but may also cause significant performance degradation for applications running on the computer system 100. To restore some of the lost performance, the system manager 112 responds to the alert signal by triggering a power handling process that increases the performance of the server nodes 102 based on the new available power budget that exists after the power supply unit failure. The power handling process that is triggered by the alert signal is described more fully in relation to FIG. 2.

The block diagram of FIG. 1 is not intended to indicate that the computer system 100 is to include all of the components shown in FIG. 1. Rather, the computer system 100 can include fewer or additional components not shown in FIG. 1, depending on the details of the specific implementation.

Figure 2:
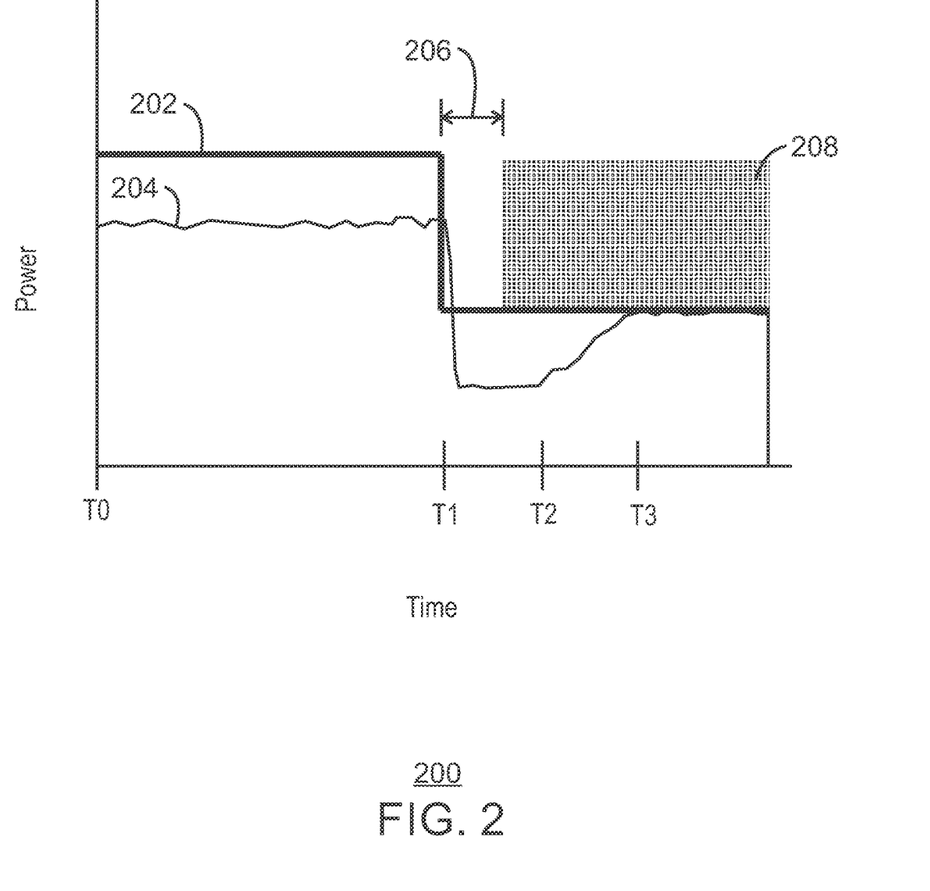
FIG. 2 is a graph showing an example of a power management process that can be implemented in a computer system, such as the computer system shown in FIG. 1.

FIG. 2 is a graph showing an example of a power management process that can be implemented in a computer system, such as the computer system shown in FIG. 1. The graph 200 shows the power consumption of the computing device changing in response to a power supply unit failure. In the graph 200, the Y-axis represents power, and the X-axis represents time. Line 202 represents the available power budget of the computing system over time and may depend, in part, on the number of operating power supply units. Line 204 represents the actual total power consumption of the computing system over time. Time T0 represents a point in time where the computing system is operating according to normal operating conditions. At time t0, the system manager 112 can be imposing a static power limit, which may be set at boot time, for example. As shown in the graph 200, power consumption of the computer system is operating well below the existing power budget at time t0.

At time T1, a power failure occurs, and the available power budget provided by the remaining power supply units drops below the current power consumption of the computing device. Immediately following the power failure, the power deficit can be supplied from the stored charge in the capacitors in the remaining power supplies. Depending on the power supply design, this capacitor charge might last anywhere from 20 milliseconds to 100 milliseconds, after which the DC rail would experience a significant voltage reduction, which could force the system into a hardware shutdown. The throttling reaction time 206 is the time within which the power should be reduced after a power failure to avoid such a hardware shutdown. Box 208 represents the prohibited operating zone.

At or shortly after time T1, logic within the power distribution system activates the alert signal, which indicates that a power failure has occurred. In some examples, the server nodes and the system manager receive this signal simultaneously. Upon receipt of the alert signal, each of the server nodes begin to implement an aggressive low power state. The low power state can be implemented according to a pre-determined power reduction scheme that reduces the power consumption of the computer system to a predetermined level. The power reduction can target performance parameters of the server node's CPU, memory, fans, or any combination thereof. Power reduction in the CPU can be accomplished by setting the CPU into a low frequency mode (LFM), which reduces the CPU's clock frequency. Memory power can be reduced by reducing the memory's bandwidth, i.e., reducing the clock frequency at which the memory operates. Power to fans can be removed by cutting the current feeding the fan motors. After the alert signal is activated, the low power state can take effect for all of the server nodes within the throttling reaction time 206, which may be 100 milliseconds, 50 milliseconds, 20 milliseconds, or any other suitable time frame based on the design of the power supply units. In some examples, the low power state can take effect in less than four milliseconds after the alert signal is activated. In some examples, the achievable power reduction caused by entering the low power state can range between one half to two thirds of full load power.

At time T1, the system manager also begins to implement a power management process. Upon receiving the alert signal, the system manager can query the controller of the power distribution system to acquire additional information about the power failure. For example, the system manager may communicate with the power distribution system to determine which power supply units have failed, the cause of the failure, and what the new power budget is. When the system manager determines the new power budget, the system manager can determine a new power limit for each of the server nodes based on the new power budget and communicate the new power limit to each one of the plurality of server nodes. The new power limit is specified such that the power consumption of the computing device will remain below the new power budget.

At time T2, the system manager commands the server nodes to deactivate the aggressive low power state implemented by the individual server nodes. After time T2, each server node can begin partially restoring its performance parameters, such as CPU clock frequency, memory's bandwidth, and the like. Each server node increases its operating parameters while also ensuring that the server node's power consumption does not exceed the new power limit received from the system manager.

At time T3, the power consumption has reached the new power limit set by the system manager. Accordingly, some of the processing performance that was lost after the power failure has been restored. The computer system may continue to operate as shown in the graph 200 until action is taken to remedy the power failure, for example, replacing or resetting the failed power supply unit.

Figure 3:
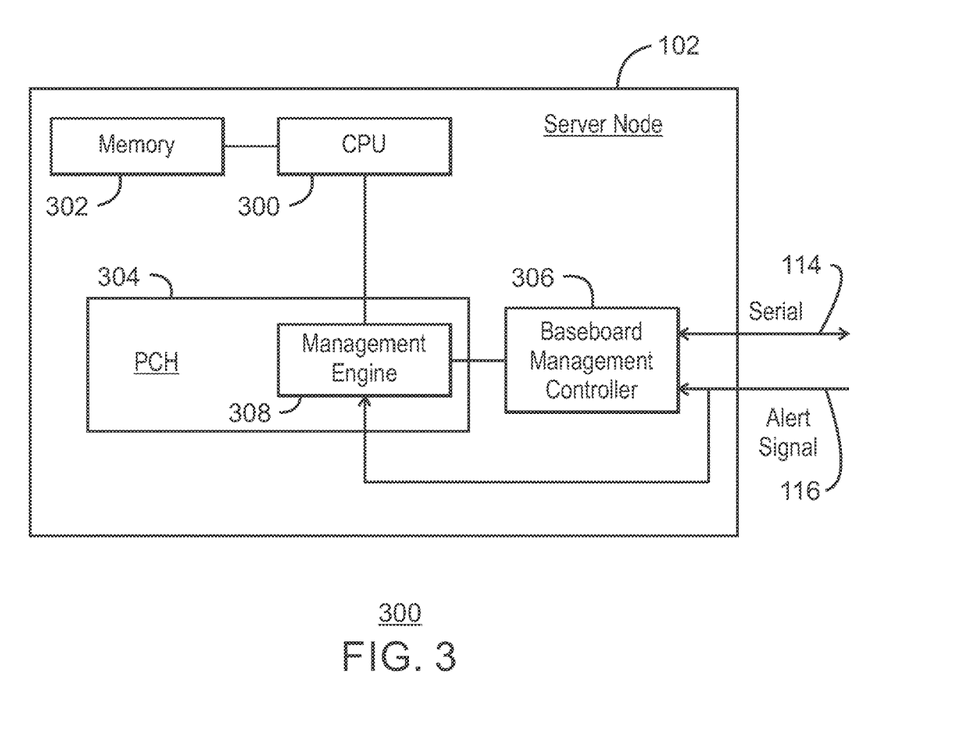
FIG. 3 is a block diagram showing an example of one of the server nodes of FIG. 1.

FIG. 3 is a block diagram showing an example of one of the server nodes of FIG. 1. As shown in FIG. 3, the server node 102 can include a Central Processing Unit CPU 300, memory device 302, Platform Controller Hub (PCH) 304, and Baseboard Management controller (BMC) 306. The central processing unit 300 is configured to execute stored instructions and can be a single core processor, a multi-core processor, a computing cluster, or any number of other configurations. Furthermore, the server node 102 may include more than one CPU 300. The memory device 302 can store data and instructions that are executable by the CPU 300, which may be coupled to the memory device 302 by a bus.

The platform controller hub 304 controls certain data paths in the server node 102. For example, the platform controller hub 304 can control communications between the CPU 300 and persistent storage or other peripheral devices. The platform controller hub 304 can include a management engine 308 that enables out-of-band management of the server node 102. The term "out-of-band" management refers to computer system management that can be implemented through a dedicated management channel regardless of whether the system is powered on or whether the system's operating system is installed or functional.

The baseboard management controller 306 serves as an interface between system management software and platform hardware. For example, the baseboard management controller 306 can be used to power cycle the system node 102, provide platform information to an administrator such as temperature data, fan speed data, operating system status, and the like. The baseboard management controller can be coupled to the management engine 308 through an out-of-band management port. The baseboard management controller 306 can also be coupled to a power source of one or more fans (not shown) of the server node 102.

Within the server node 102, the alert signal is conveyed to the baseboard management controller 306 and to the management engine 308 of the platform controller hub 304. The alert signal is coupled to the baseboard management controller 306 through a dedicated logic input of the baseboard management controller 306. The routing to the management engine 308 can be direct or can pass through the baseboard management controller. In the example shown in FIG. 3, the serial line 114 and the alert signal line 116 are coupled to the baseboard management controller 306 and alert signal passes through the baseboard management controller 306 to the management engine 308. In response to activation of the alert signal, the baseboard management controller 306 can respond by throttling the server node 102 as discussed above. The baseboard management controller 306 can eliminate power to the fans by turning of the current feeding the fan motors. The baseboard management controller 306 can also send the alert signal to the management engine 308 of the platform controller hub 304.

The management engine 308 can set the CPU 300 into low frequency mode (LFM), for example, through the assertion of the PROCHOT# signal into the CPU 300. The PROCHOT# signal is a hardware interrupt that is implemented on a dedicated input line of the CPU 300 and can be activated to throttle the CPU 300 if the temperature of the CPU 300 exceeds a threshold. The management engine 308 can reduce the memory power by cutting the memory bandwidth, for example, through the assertion of the MEMHOT# signal into the CPU 300. The MEMHOT# signal is a hardware interrupt that is implemented on a dedicated input line of the CPU 300 and can be activated to reduce the bandwidth of the memory device if the temperature of the memory device exceeds a threshold.

Through the serial lines 114, the baseboard management controller can receive additional power management instructions from the system manager 112 (FIG. 1). For example, the system manager 112 may determine a suitable power limit for the server node 106 that will enable the total computing system power to stay within the available power budget. After communicating the new power limit to the server node 102, the system manager 112 can command the server node to deactivate the low power state. In response to deactivating the low power state, the baseboard management controller 306 can turn on the power to the fans and the management engine can de-assert the PROCHOT# signal and MEMHOT# signal. After deactivating the low power state, the server node 102 can begin to increase its processing performance within the power limit set by the system manager 112.

The server node shown in FIG. 3 is just one example of a server node that can implement the techniques disclosed herein. A server node 102 in accordance with the disclosed techniques can include more of fewer components than what is shown in FIG. 3. For example, the server node 102 can include additional components such as a main memory such as Dynamic Random Access Memory (DRAM), storage memory, additional processors, and communication ports, among others. Additionally, the functions performed by the Platform Controller Hub 302 and a Baseboard Management Controller 304 may be performed by a different component or combination of components that are configured differently than what is shown in FIG. 3.

It will be appreciated that FIGS. 1-3 provide examples of the disclosed techniques and that various changes can be made according to the design considerations of a particular implementation. For example, the techniques disclosed herein can be implemented in variety of server form factors, including traditional rack or pedestal server form factors, each node with individual power supplies, and racks or chassis fed from a common set of power supplies. Routing the serial lines 114 and alert signal line 116 to all the server nodes 102 and the system manager 112 allows flexibility in implementing a variety of algorithms. Each server node 102 can implement and enforce local node policies (through the baseboard management controller 306, for example) whereas the system manager 112 performs coordination roles. In some examples, the techniques disclosure herein can be implemented by the server nodes 102 performing their duties through peer-to-peer algorithms. To enable per-to-peer algorithms, additional communication channels may be included to implement certain management algorithms, not shown here. These additional communication channels may be implemented through the serial lines or Ethernet networks to the baseboard management controller, for example.

Figure 4:
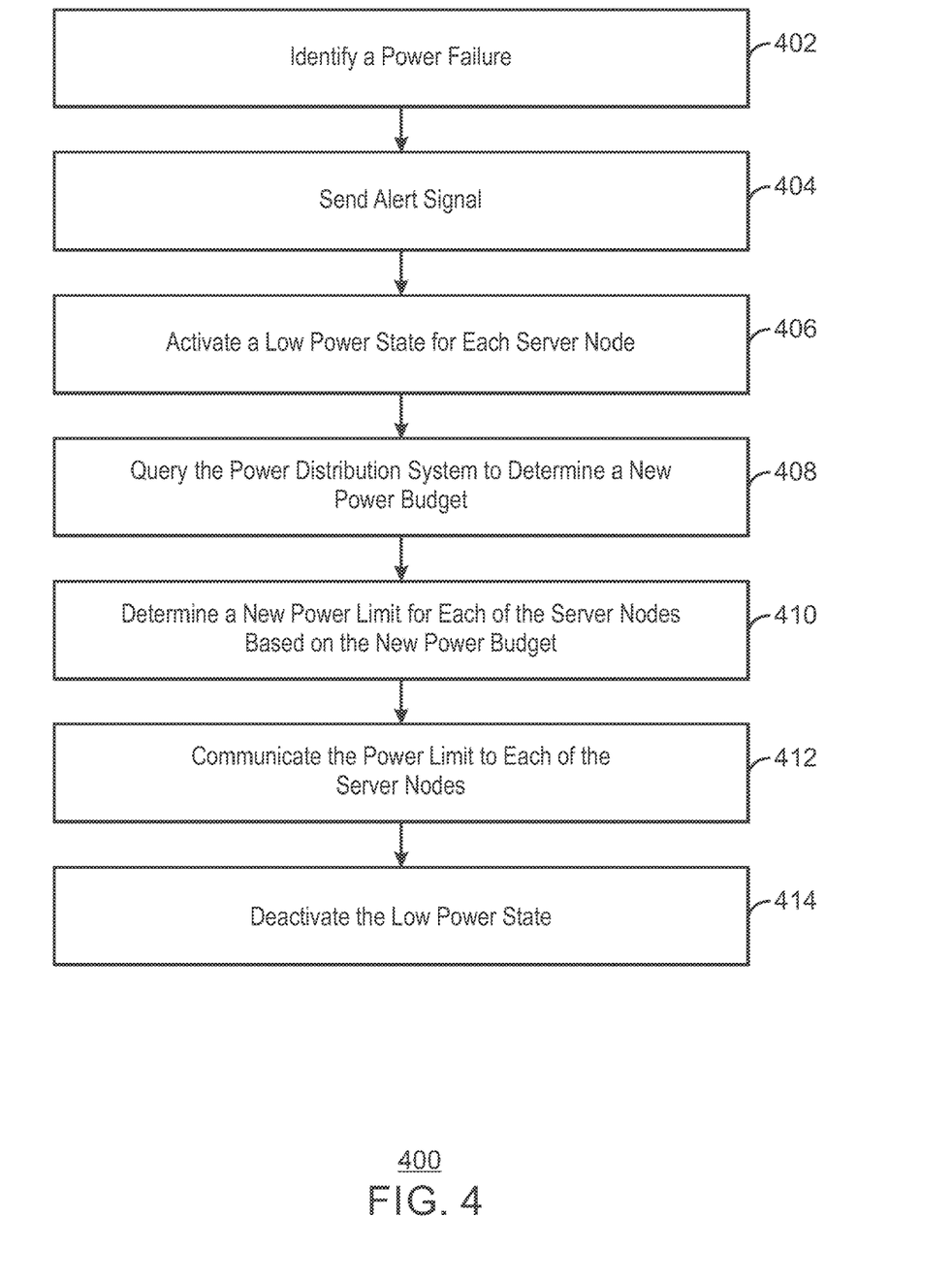
FIG. 4 is a process flow diagram of a method of managing power in computer system such as the computer system shown in FIG. 1.

FIG. 4 is a process flow diagram of a method of managing power in computer system such as the computer system shown in FIG. 1. The method 400 may be performed by various components of the computing system 100 shown in FIG. 1 such as the system manager 112, server nodes 102, the power distribution system 104, or some combination thereof.

At block 402, a power failure is identified, for example, by the power distribution system. The power failure may be a partial power failure such as the failure of one power supply unit our of two or more power supply units included in the computer system.

At block 404, an alert signal is sent by the power distribution system to each of the server nodes. The alert signal can be sent to each of the server nodes through a hardware-based alert signal line that couples the power distribution system to the server nodes. The alert signal can be sent to all of the server nodes simultaneously. As used herein, the term "simultaneously" can include a time span that accounts for small differences in the arrival time of the alert signal at different server nodes attributable to propagation delays along the alert signal lines. In some examples, the alert signal is also sent to the system manager of the computer system at the same time that the alert signal is sent to the server nodes. In some examples, the alert signal can trigger a two-phase power regulation process. The first phase is a fast-acting power reduction process that responds to the immediate emergency by implementing a pre-determined low power state. The second phase is a slower process wherein the system manager identifies a new power budget for the computer system and gradually increases the performance parameters of each of the server nodes while remaining under the new power budget. The first phase of the two-phase power reduction process is described in relation to block 406. The second phase of the two-phase power reduction process is described in relation to blocks 408 to 414.

At block 406, a low power state is activated at each server node in response to the alert signal. Because each server node receives the alert signal at substantially the same time, the server nodes enter the low power state in parallel. All of the server nodes can finish activating the low power state within a short time period after the power failure, for example, 20 to 100 milliseconds. Activating the low power state can include reducing the clock frequency of a central processing unit by asserting the PROCHOT# signal into the CPU, for example. Activating the low power state can also include reducing the bandwidth of the memory device included in the server node by asserting the MEMHOT# signal into the CPU, for example. Activating the low power state can also include turning off the power to one or more fans included in the server node.

At block 408, the power distribution system is queried to determine the new power budget that is available after the power failure. The power distribution system can be queried by the system manager, for example. The power distribution system can be queried by communicating with the power distribution system through a serial communication line.

At block 410, a new power limit can be determined for each of the server nodes based on the new power budget. The new power limit ensures that the total power consumption of the computing system will not exceed the new power budget. The new power limit can be determined by the system manager.

At block 412, the new power limit can be communicated to each of the server nodes. The new power limit can be communicated from the system manager to each of server nodes through one or more serial communication lines. Thus, the new power limits will be communicated one server node at a time or in groups of limited numbers of server nodes, such as 2, 4, 8, 16 server nodes at a time, or any other suitable number depending on the design of a particular implementation.

At block 414, each server node is commanded to deactivate the low power state by the system manager, for example. For each server node, the command to deactivate the low power state can be received from the system manager at the same time as the new power limit. In some examples, the command to deactivate the low power state is received only after all of the server nodes have received the new power limit.

Figure 5:
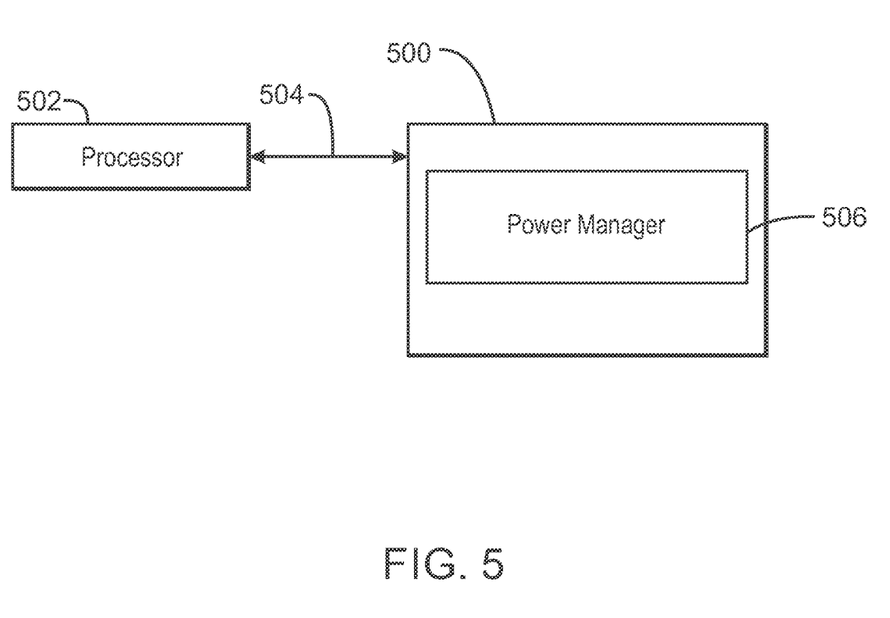

FIG. 5 is a block diagram showing a tangible, non-transitory, computer-readable medium that stores code for managing power in a computer system, such as the computer system 100 of FIG. 1. The computer-readable medium 500 may be accessed by a processor 502 over a computer bus 504. Furthermore, the tangible, non-transitory computer-readable media 500 may include code configured to direct the operations of a processor 502 to perform the techniques described herein. In some examples, the computer-readable medium may be a storage device included in or accessible to the system manager 112 of FIG. 1, and the processor 502 may be a processor include in the system manager 112.

Various software components may be stored on the computer-readable medium 500, including a power manager 506 that can perform some or all of the power management techniques described herein. For example, the power manager 506 can direct the processor to receive an alert signal from a power distribution system through a hardware-based alert signal line, wherein the alert signal indicates a power failure. The power manager 506 can also direct the processor to query the power distribution system to determine a new power budget that indicates a level of power available after the power failure, and determine a power limit for each one of a plurality of server nodes based on the new power budget. The power manager 506 can also direct the processor to communicate the power limit to each one of the plurality of server nodes and command each server node to deactivate a low power state that was activated by each server node in response to receiving the alert signal.

The block diagram of FIG. 5 is not intended to indicate that the tangible, non-transitory computer-readable media 500 are to include all of the components shown in FIG. 5. Further, the tangible, non-transitory computer-readable media 500 may include any number of additional components not shown in FIG. 5, depending on the details of the specific implementation.

EXAMPLES

Examples may include subject matter such as a method, means for performing acts of the method, at least one machine-readable medium including instructions that, when performed by a machine cause the machine to performs acts of the method, or of an apparatus or system for managing power consumption according to embodiments and examples described herein.

Example 1 is a computer system configured to manage power consumption in response to a power failure. The computer system includes a plurality of server nodes, a power distribution system that provides power to the plurality of server nodes, a hardware-based alert signal line that couples the power distribution system to the plurality of server nodes. If a power failure occurs, the power distribution system is to send an alert signal to all of the server nodes through the alert signal line. The alert signal is to trigger each server node to activate a low power state. Optionally, to activate the low power state, each server node can reduce the clock frequency of a central processing unit (CPU) included in the server node, or reduce a bandwidth of a memory device included in the server node, or turn off power to one or more fans included in the server node, or any combination thereof. To reduce the clock frequency of a central processing unit, the server node may assert a PROCHOT# signal into the CPU. To reduce the bandwidth of the memory device, the server node may assert a MEMHOT# signal into the CPU.

Example 2 is a computer system that includes the subject matter of Example 1, either including or omitting optional features, and wherein the power distribution system is to send the alert signal to all of the server nodes simultaneously. In Examples 1 and 2, all of the server nodes may be able to activate the low power state within a time period of 100 milliseconds after the power failure.

Example 3 is a computer system that includes the subject matter of Example 1 or Example 2, either including or omitting optional features, and further including a system manager communicatively coupled to each of the server nodes and the power distribution system through serial communication lines. The alert signal line is coupled to the system manager, and if a power failure occurs, the power distribution system is to send the alert signal to the system manager through the alert signal line. In Example 3, the system manager may, upon receipt of the alert signal, communicate with the power distribution system through serial communication lines to identify a new power budget and increase performance parameters of each server node while remaining under the new power budget.

Example 4 is system that includes a plurality of server nodes and a system manager to manage the power consumption of the plurality of server nodes in response to a power failure. The system includes logic to identify a power failure; logic to send an alert signal to each of a plurality of server nodes through a hardware-based alert signal line that couples the power distribution system to the plurality of server nodes; logic within each server node to activate a low power state for each server node in response to the alert signal; and logic within the system manager to communicate a new power limit to each of the server nodes and command each server node to deactivate the low power state. Optionally, the logic within each server node to activate the low power state is to reduce the clock frequency of a central processing unit included in the server node, or reduce a bandwidth of a memory device included in the server node, or turn off power to one or more fans included in the server node, or any combination thereof. To reduce the clock frequency of a central processing unit, the logic to activate the low power state may assert a PROCHOT# signal into the CPU. To reduce the bandwidth of the memory device, the logic to activate the low power state may assert a MEMHOT# signal into the CPU.

Example 5 is a system that includes the subject matter of Example 4, either including or omitting optional features, and wherein the logic to send the alert signal to each of the plurality of server nodes is to send the alert signal to all of the server nodes simultaneously. In Examples 4 and 5, all of the server nodes may be able to activate the low power state within a time period of 100 milliseconds after the power failure.

Example 6 is a system that includes the subject matter of Example 4 or Example 5, either including or omitting optional features, wherein the logic to send the alert signal to each of the plurality of server nodes also includes logic to send the alert signal to the system manager through the alert signal line. In Example 6, the system manager can include logic that, upon receipt of the alert signal, communicates with the power distribution system through a serial communication line to determine a new power budget that indicates a level of power available after the power failure and determines the new power limit for each one of a plurality of server nodes based on the new power budget.

Example 7 is a non-transitory, tangible, computer-readable medium that includes instructions to direct a processor to manage the power consumption of a computer system in response to a power failure. The instructions direct the processor to receive an alert signal from a power distribution system through a hardware-based alert signal line, the alert signal indicating a power failure; query the power distribution system to determine a new power budget that indicates a level of power available after the power failure; determine a power limit for each one of a plurality of server nodes based on the new power budget; and communicate the power limit to each one of the plurality of server nodes and command each server node to deactivate a low power state that was activated by each server node in response to receiving the alert signal. Optionally, the instructions that direct the processor to query the power distribution system direct the processor to communicate with the power distribution system through a serial communication line. In Example 7, either including or omitting other optional features, the instructions that direct the processor to communicate the power limit to each one of the plurality of server nodes direct the processor to communicate with the plurality of server nodes through a serial communication line.

Example 8 is a method of managing the power consumption of a computer system in response to a power failure. The method includes identifying a power failure; sending an alert signal to each of a plurality of server nodes through a hardware-based alert signal line that couples the power distribution system to the plurality of server nodes; activating a low power state for each server node in response to the alert signal; and communicating a new power limit to each of the server nodes and commanding each server node to deactivate the low power state. Optionally, activating the low power state includes reducing the clock frequency of a central processing unit (CPU) included in the server node, or reducing a bandwidth of a memory device included in the server node, or turning off power to one or more fans included in the server node, or any combination thereof. Reducing the clock frequency of a central processing unit can optionally include asserting a PROCHOT# signal into the CPU. Reducing the bandwidth of the memory device can optionally include asserting a MEMHOT# signal into the CPU.

Example 9 is a method that includes the subject matter of Example 1, either including or omitting optional features, wherein sending the alert signal to each of the plurality of server nodes includes sending the alert signal to all of the server nodes simultaneously. In Examples 8 and 9, all of the server nodes may be able to activate the low power state within a time period of 100 milliseconds after the power failure.

Example 10 is a computer system that includes the subject matter of Example 8 or Example 9, either including or omitting optional features, wherein sending the alert signal to each of the plurality of server nodes includes sending the alert signal to the system manager through the alert signal line. In Example 10, the method can include communicating, upon receipt of the alert signal, with the power distribution system through a serial communication line to determine a new power budget that indicates a level of power available after the power failure and determining the new power limit for each one of a plurality of server nodes based on the new power budget.

Example 11 is a machine-readable medium including code, when executed, to cause an electronic device to perform the method of Examples 8, 9, or 10.

Example 12 is an apparatus that includes means to perform a method as described in Examples 8, 9, or 10.

Example 13 is an apparatus for managing the power consumption of a computer system in response to a power failure. The apparatus includes means for identifying a power failure; means for sending an alert signal to each of a plurality of server nodes through a hardware-based alert signal line that couples the power distribution system to the plurality of server nodes; means for activating a low power state for each server node in response to the alert signal; and means for communicating a new power limit to each of the server nodes and commanding each server node to deactivate the low power state. Optionally, the means for activating the low power state reduce the clock frequency of a central processing unit included in the server node, or reduce a bandwidth of a memory device included in the server node, or turn off power to one or more fans included in the server node, or any combination thereof. The means for reducing the clock frequency of the central processing unit may assert a PROCHOT# signal into the CPU. The means for reducing the bandwidth of the memory device may assert a MEMHOT# signal into the CPU.

Example 14 is an apparatus that includes the subject matter of Example 13, either including or omitting optional features, wherein the means for sending the alert signal to each of the plurality of server nodes sends the alert signal to all of the server nodes simultaneously. In Examples 13 and 14, all of the server nodes may be able to activate the low power state within a time period of 100 milliseconds after the power failure.

Example 15 is an apparatus that includes the subject matter of Example 13 or Example 14, either including or omitting optional features, and also includes means for sending the alert signal to the system manager through the alert signal line.

Example 16 is an apparatus that includes the subject matter of Example 13, Example 14, or Example 15, either including or omitting optional features, and also includes means for communicating, in response to the alert signal, with the power distribution system through a serial communication line to determine a new power budget that indicates a level of power available after the power failure; and means for determining the new power limit for each one of a plurality of server nodes based on the new power budget.

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A computer system, comprising:
a plurality of server nodes;
a power distribution system that provides power to the plurality of server nodes; and
a hardware-based alert signal line that couples the power distribution system to the plurality of server nodes;
wherein, if a power failure occurs, the power distribution system is to send an alert signal to all of the server nodes through the alert signal line, the alert signal to trigger each server node to activate a low power state.

2. The computer system of claim 1, wherein to activate the low power state comprises the server node to reduce the clock frequency of a central processing unit (CPU) included in the server node.

3. The computer system of claim 2, wherein to reduce the clock frequency of the CPU, the server node asserts a PROCHOT# signal into the CPU.

4. The computer system of claim 1, wherein to activate the low power state comprises the server node to reduce a bandwidth of a memory device included in the server node.

5. The computer system of claim 4, wherein to reduce the bandwidth of the memory device, the server node asserts a MEMHOT# signal into a CPU coupled to the memory device.

6. The computer system of claim 1, wherein to activate the low power state comprises the server node to turn off power to one or more fans included in the server node.

7. The computer system of claim 1, wherein the power distribution system is to send the alert signal to all of the server nodes simultaneously.

8. The computer system of claim 1, wherein all of the server nodes activate the low power state within a time period of 100 milliseconds after the power failure.

9. The computer system of claim 1, comprising a system manager communicatively coupled to each of the server nodes and the power distribution system through serial communication lines, wherein the alert signal line is coupled to the system manager, and if a power failure occurs, the power distribution system is to send the alert signal to the system manager through the alert signal line.

10. The computer system of claim 9, wherein, upon receipt of the alert signal, the system manager is to communicate with the power distribution system through the serial communication lines to identify a new power budget and increase performance parameters of each server node while remaining under the new power budget.

11. A system comprising a plurality of server nodes and a system manager, comprising:
logic to identify a power failure;
logic to send an alert signal to each of a plurality of server nodes through a hardware-based alert signal line that couples the power distribution system to the plurality of server nodes and the system manager;
logic within each server node to activate a low power state for each server node in response to the alert signal; and
logic within the system manager to, in response to the alert signal, determine a new power limit for each of the server nodes, communicate the new power limit to each of the server nodes, and command each server node to deactivate the low power state, wherein after deactivating the low power state, each server node operates within the new power limit.

12. The system of claim 11, wherein the logic to activate the low power state is to reduce the clock frequency of a central processing unit (CPU) included in the server node.

13. The system of claim 12, wherein to reduce the clock frequency of the CPU, the logic to activate the low power state asserts a PROCHOT# signal into the CPU.

14. The system of claim 11, wherein the logic to activate the low power state is to reduce a bandwidth of a memory device included in the server node.

15. The system of claim 14, wherein to reduce the bandwidth of the memory device, the logic to activate the low power state asserts a MEMHOT# signal into a CPU coupled to the memory device.

16. The system of claim 11, wherein the logic to activate the low power state is to turn off power to one or more fans included in the server node.

17. The system of claim 11, wherein the logic to send the alert signal to each of the plurality of server nodes is to send the alert signal to all of the server nodes simultaneously.

18. The system of claim 11, wherein all of the server nodes activate the low power state within a time period of 100 milliseconds after the power failure.

19. The system of claim 11, wherein the logic to send the alert signal to each of the plurality of server nodes comprises logic to send the alert signal to the system manager through the alert signal line.

20. The system of claim 19, comprising logic within the system manager to, upon receipt of the alert signal, communicate with the power distribution system through a serial communication line to determine a new power budget that indicates a level of power available after the power failure and determine a power limit for each one of a plurality of server nodes based on the new power budget.

21. A non-transitory, tangible, computer-readable medium, comprising instructions to direct a processor to:
- receive an alert signal from a power distribution system through a hardware-based alert signal line, the alert signal indicating a power failure, wherein the alert signal causes each one of a plurality of server nodes to activate a low power state in response to receiving the alert signal through the hardware-based alert signal line;
- in response to the alert signal, query the power distribution system to determine a new power budget that indicates a level of power available after the power failure;
- determine a power limit for each one of the plurality of server nodes based on the new power budget; and
- communicate the power limit to each one of the plurality of server nodes and command each server node to deactivate the low power state, wherein after deactivating the low power state, each server node operates within the new power limit.

22. The computer-readable medium of claim 21, wherein the instructions that direct the processor to query the power distribution system direct the processor to communicate with the power distribution system through a serial communication line.

23. The computer-readable medium of claim 21, wherein the instructions that direct the processor to communicate the power limit to each one of the plurality of server nodes direct the processor to communicate with the plurality of server nodes through a serial communication line.

* * * * *